Figure 1:
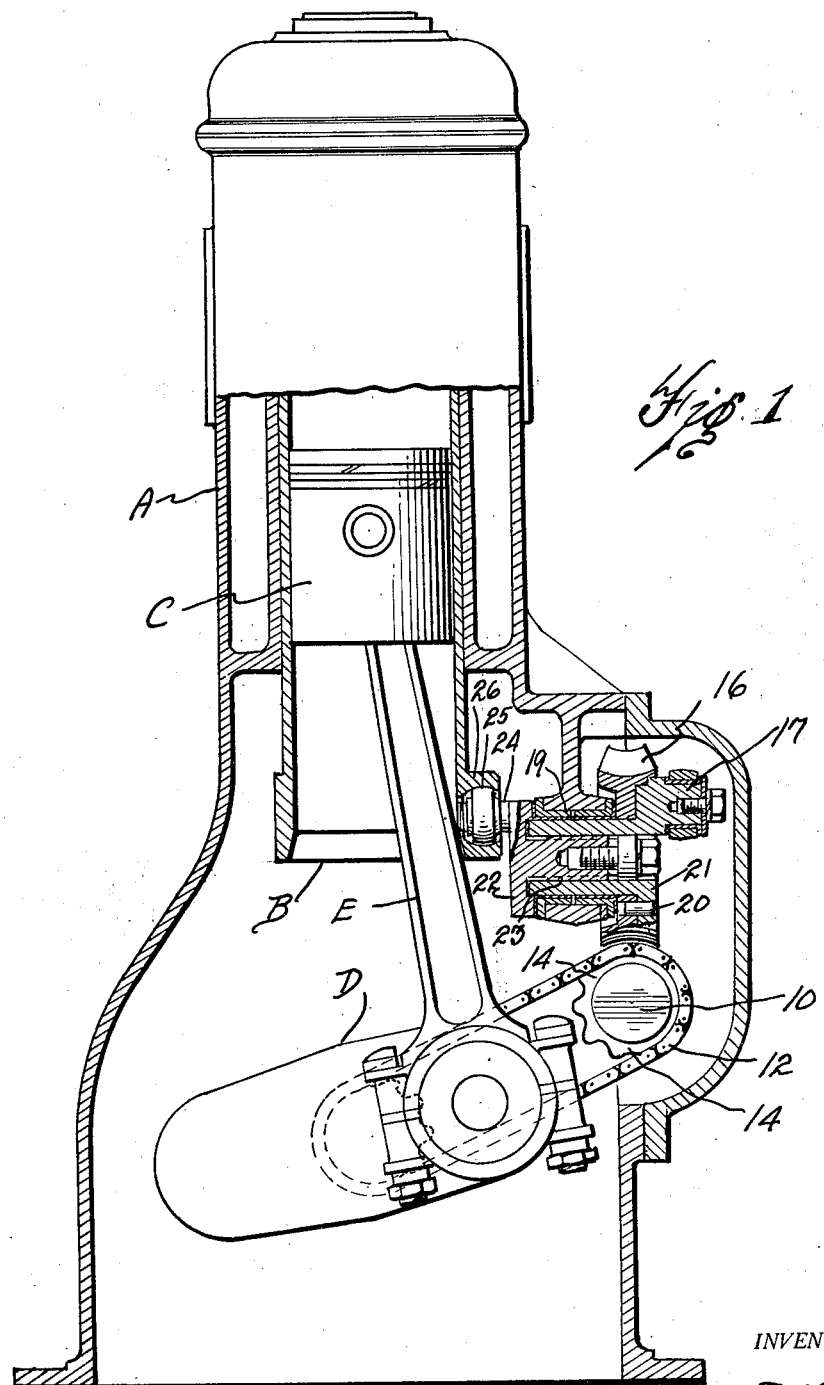

April 5, 1932.  A. J. MEYER  1,852,181
SLEEVE VALVE DRIVING MECHANISM
Filed Nov. 7, 1927   2 Sheets-Sheet 1

INVENTOR.
ANDRE J. MEYER
BY W. W. Harris
ATTORNEY.

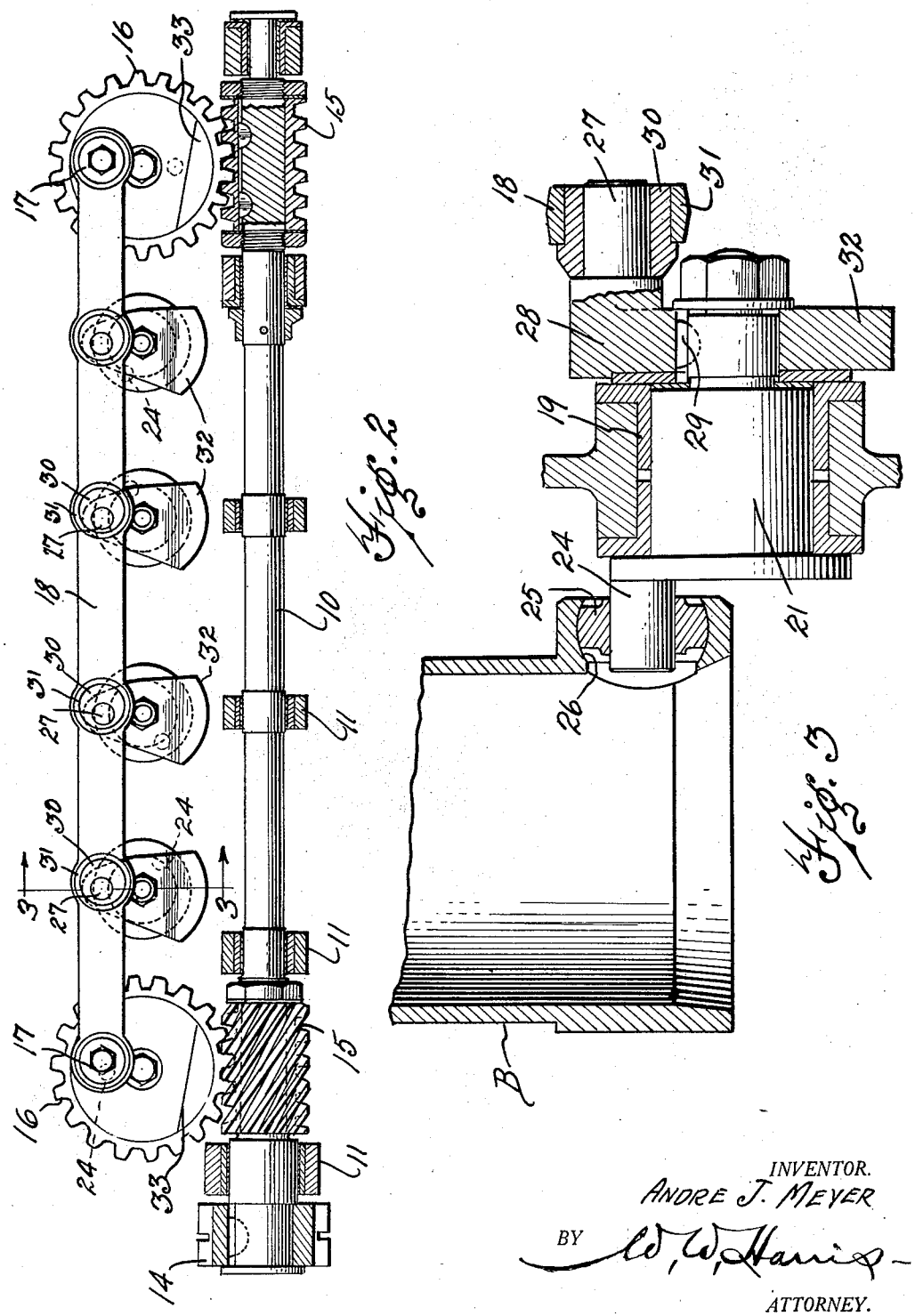

Patented Apr. 5, 1932

1,852,181

UNITED STATES PATENT OFFICE

ANDRE J. MEYER, OF DETROIT, MICHIGAN, ASSIGNOR TO CONTINENTAL MOTORS CORPORATION, OF DETROIT, MICHIGAN, A CORPORATION OF VIRGINIA

SLEEVE VALVE DRIVING MECHANISM

Application filed November 7, 1927. Serial No. 231,419.

This invention relates to internal combustion engines and in the embodiment illustrated refers more particularly to the single sleeve valve type of engine generally known as the "Burt-McCollum" single sleeve valve engine. In this type of engine a single sleeve is associated with each cylinder of the engine, the sleeve having a combined reciprocating and oscillating movement with respect to the sleeve axis whereby any point on the sleeve moves in a closed curve path with respect to the associated cylinder in moving the sleeve intake and exhaust ports into and out of registration with cooperating ports of the cylinder. An engine of the aforesaid general character is well known in the art, my invention comprising an improved driving mechanism for the sleeve valves of of an engine of such type.

One object of my invention resides in the provision of a simplified sleeve driving mechanism which is constructed so as to be readily manufactured and assembled. A further object is to provide a compensating structure facilitating the manufacture, assembly, and operation of the engine; such construction preventing binding of the driving mechanism.

A still further feature of my invention resides in the provision of a sleeve driving mechanism provided with means counterbalancing the moving parts whereby stresses and vibrations are reduced.

Further features of my invention reside in the combination and arrangement of parts more particularly hereinafter described and claimed.

Referring to the drawings in which like reference characters indicate corresponding parts, Fig. 1 is a sectional view through a cylinder and sleeve of the engine illustrating the sleeve driving mechanism, Fig. 2 is a detail side elevation view of the driving link for the sleeve valves, and Fig. 3 is a detail sectional view through 3—3 of Fig. 2.

In the drawings reference character A represents one of the engine cylinders, B the associated sleeve valve of the aforesaid character, C the associated piston, D the engine crankshaft, and E the connecting rod between the piston C and crankshaft D, such parts being of a construction generally well known in the art.

Extending longitudinally of the engine is a valve layshaft 10 rotatable in suitable bearings 11 and driven from the crankshaft as by the chain 12 meshing with driving crankshaft gear 13 and driven valveshaft gear 14.

Located adjacent opposite ends of the valveshaft and carried thereby are driving gears or worms 15 adapted to drive gears or wormwheels 16. The gears 16 actuate cranks 17, a driving link 18 extending longitudinally of the engine parallel with the crankshaft D and valveshaft 10 being driven by these cranks. In Fig. 1 the section is taken through one of the gears 16 and associated sleeve and cylinder. In this figure the gear 16 rotates in the bearing 19 by connection through pin 20 with a cross shaft 21, the latter carrying the aforesaid crank 17. The shaft 21 preferably has a relatively adjustable portion 22 as through cooperating keys and keyways 23 so that these two shaft portions may be angularly relatively adjusted facilitating timing of the sleeve valves. The shaft portion 22 carries a sleeve crank 24 suitably connected with sleeve B to impart thereto the aforesaid movement. Thus the crank 24 may slidably carry the ball 25 operable in the sleeve socket 26.

Each of the cylinders and associated sleeve valve intermediate the end cylinders, has its sleeve valve driven from link 18 by a mechanism generally similar to that shown in Fig. 1 and differing therefrom as illustrated in Figs. 2 and 3. Thus opposite each sleeve valve a cross-shaft 21 is rotated in a bearing 19, such cross-shaft being rotated by a crank 27 having an arm 28 keyed at 29 to the cross-shaft. Engaging the crank 27 is an eccentric 30, the latter being operated by straps 31 formed in the link 18. An important feature of my invention resides in mounting the eccentrics 30 loosely on shafts 27 as distinguished from being keyed thereon whereby the eccentrics may relatively slightly adjust themselves to compensate for ordinary machining and assembling inaccuracies throughout the mechanism. For example if the centers of the bearings 19 were not exactly spaced then a binding tendency of the link 18 would result. Another example of a likely inaccuracy compensated for by my construction arises from slight variations in the center distances between cranks 24 and 27. The amount of eccentricity between each eccentric 30 and crank 27 is such that wedging of these parts does not take place.

As shown in Figs. 2 and 3 the crank arms 28 are provided with counterweights 32 substantially balancing the movement of the link 18, sleeves B, and other parts of the mechanism. The wormwheels 16 may also be counterweighted as at 33. With such counterweights a smoother valve operation is obtainable, stresses reduced, and higher engine speeds attainable safely.

In operation the crankshaft D drives the valveshaft 10 which in turn rotates the driven gears 16. For a four stroke cycle engine the gears 16 will make one revolution for two of the crankshaft, the gears 15 and 16 having a two to one ratio for such an engine cycle. The gears 16 move the link 18 parallel to itself with a combined vertical and horizontal movement whereby each crank 27 is driven. The sleeve cranks 24 are thereby rotated, imparting to the associated sleeve valves the aforesaid movement typical of this type of sleeve engine. The sleeve cranks 24 are relatively angularly positioned with respect to the cranks 27 to obtain the relative cyclic functioning of the various cylinders and sleeves as will be understood.

Certain features of my invention will be useful in connection with various types of engines and I do not limit the scope of my invention apart from the appended claims.

What I claim as my invention is:

1. In a sleeve valve engine, a cylinder, a piston, a single sleeve valve having a combined oscillating and reciprocating movement with respect to the sleeve and cylinder axes, a crankshaft driven by the piston, sleeve driving means including a valveshaft driven by the crankshaft, mechanism intermediate the valveshaft and sleeve for imparting to the sleeve the aforesaid movement, and compensating means comprising relatively movable members connected together and included in the said sleeve driving means responsive to a binding tendency of the sleeve driving means for causing an adjustment of said members relative to each other thereby relieving the binding tendency without substantially altering the normal functioning of the sleeve driving means.

2. In a sleeve valve engine, a cylinder, a piston, a single sleeve valve having a combined oscillating and reciprocating movement with respect to the sleeve and cylinder axes, a crankshaft driven by the piston, a sleeve driving means including a valveshaft driven by the crankshaft, mechanism intermediate the valveshaft and sleeve for imparting to the sleeve the aforesaid movement including relatively driven eccentric and crank members, said members being relatively movable within restraining limits.

3. The combination with an internal combustion engine having a plurality of aligned cylinders, pistons operable within the respective cylinders, a single sleeve valve between each piston and associated cylinder having a combined oscillating and reciprocating movement with respect to the sleeve and cylinder axes, and a crankshaft driven by the pistons, of a sleeve driving link positioned to one side of the plane of the sleeve and cylinder axes moving in a plane parallel with the plane of the cylinder and sleeve axes whereby the link occupies successive parallel positions, straps spaced longitudinally of the link, eccentrics operable in said straps, cranks driven by the eccentrics, said cranks and associated eccentrics being slightly relatively rotatable, means for driving the link from the crankshaft, and means connecting the cranks and associated sleeve valves for imparting thereto the aforesaid movement.

4. In a sleeve valve engine, a cylinder, a piston, at least one sleeve valve movably associated with the cylinder, a crankshaft, and sleeve driving means between the crankshaft and sleeve valve, and means comprising a plurality of relatively adjustable members for permitting a slight compensating adjustment of the sleeve driving means located intermediate the crankshaft and the sleeve.

In witness whereof, I hereunto subscribe my name this 5th day of November, A. D. 1927.

ANDRE J. MEYER.